Figure 1:
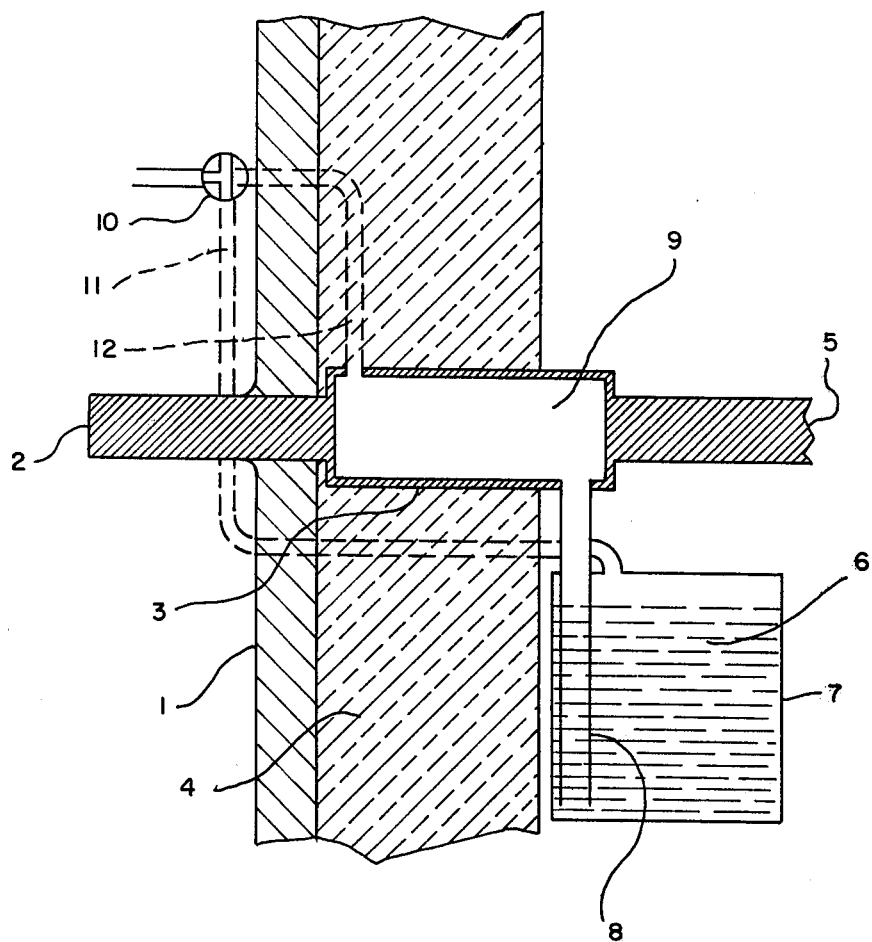

United States Patent [19]

Borger

[11] 4,327,162
[45] Apr. 27, 1982

[54] BATTERY TERMINAL FOR HIGH TEMPERATURE BATTERIES

[75] Inventor: Waldemar Borger, Kelkheim, Fed. Rep. of Germany

[73] Assignee: Varta Batterie Aktiengesellschaft, Hanover, Fed. Rep. of Germany

[21] Appl. No.: 181,001

[22] Filed: Aug. 25, 1980

[30] Foreign Application Priority Data

May 30, 1980 [DE] Fed. Rep. of Germany ....... 2936202

[51] Int. Cl.³ .................... H01M 2/06; H01M 10/50
[52] U.S. Cl. .................................. 429/120; 429/178
[58] Field of Search ...................... 429/120, 178, 112

[56] References Cited

U.S. PATENT DOCUMENTS 2,855,453 10/1958 Eidensohn ......................... 429/120
4,042,757 8/1977 Jones ................................. 429/120
4,235,956 11/1980 Gross et al. ........................ 429/120

*Primary Examiner*—Donald L. Walton
*Attorney, Agent, or Firm*—Weiser, Stapler & Spivak

[57] ABSTRACT

A battery terminal for high temperature batteries is made in the form of a hollow conductor in the area in which it traverses the heat insulation of the housing wall. Its hollow interior is filled with a molten liquid metal only during periods of operation. During rest periods, the molten liquid metal is in a storage container and the resulting vacuum, or inert gas which remains in the hollow space, forms a barrier for heat conduction from the hot battery interior toward the outside, so that battery and load are decoupled not only electrically but also thermally.

7 Claims, 1 Drawing Figure

BATTERY TERMINAL FOR HIGH TEMPERATURE BATTERIES

The invention relates to a terminal for high temperature batteries.

In high performance batteries which operate based upon an electrochemical high temperature system with molten liquid or solid electrolytes, the problem of heat insulation assumes special importance. For example, the operating temperature of a lithium/iron sulfide battery with a molten lithium chloride-potassium chloride salt mixture lies between 670 and 770° K.

In its conventional forms of construction, the individual high temperature cell has a steel container from whose top there protrude only the positive and negative electrode take-off conductors. Appropriately, a pass-through in the container wall is provided only for the positive take-off, whereas the negative take-off is welded directly to the container because this can be short-circuited to the negative electrodes.

For a battery housing which contains several of these cells, there exists the need to provide an effective heat barrier which, on the one hand, prevents rapid solidifying of the molten electrolyte during rest period of the battery and, on the other hand, also protects the load from too pronounced heating effects. An effective thermal insulation of high temperature batteries has become possible by the use of new materials, preferably in multi-layer, or "multi-foil" form.

Apart from these measures, however, there still remain the current conductors, i.e., battery terminals which constitute a path extending from the hot interior of the battery to the load, which is at ambient temperature, and which provide good electrical and thermal conductivity therebetween.

In practice, there are mostly drawn high currents of the order of magnitude of 100 to 200 amps. Because of this, it is essential, in order to obtain the lowest possible conductor resistance, to provide the battery terminal with a correspondingly large cross-section. This electrical coupling of the hot cells with the cold load necessarily also creates good thermal coupling. This is undesirable, because it is conducive to heat losses from the battery which must be compensated by supplemental heating during rest periods.

Accordingly, it is an object of the invention to provide a system which makes it possible to largely prevent the heat flow from the battery through the terminals during the rest periods of a high temperature battery, at the same time that it is decoupled electrically from the load.

This and other objects which will appear are achieved in accordance with the invention by constructing the battery terminal, in the region of traversal of the heat insulation of the battery housing, as a hollow conductor whose hollow interior is filled with an easily meltable metal during operation of the battery.

By filling the hollow interior with a molten liquid metal, the transmission of high currents by the battery terminal during the operating phases is assured. The metal may be one which is liquid at room temperature, such as mercury. However, low melting point alkali metals such as sodium and potassium, or heavy metals such as tin, lead, zinc, and indium are also suitable. What is important is that their melting point be lower than the temperature of the enviornment of the hollow interior in the battery terminal.

During rest periods of the battery, the hollow interior is emptied of the molten liquid metal, which flows through a duct back into a storage container. The empty hollow interior of the battery terminal, which may also be evacuated or filled with an inert gas such as helium or argon, then provides a barrier to heat flow from the hot battery interior to the exterior. Thus, battery and load are largely thermally decoupled in the hot area of the insulating housing.

The fact that the current conduction within the hollow interior of the battery terminal is performed by a liquid and less conductive metal, makes it necessary to enlarge the cross-section of this portion of the structure, because the electrical resistance should remain the same as for a solid terminal.

In Table 1 below, there are shown some specific resistivities of copper and sodium at various absolute temperatures, in order to determine the cross-sectional enlargement.

TABLE 1

| | SPECIFIC RESISTIVITY OF COPPER AND SODIUM ($\mu\Omega$cm) | | | |
|---|---|---|---|---|
| T(° K.) | 298 | 473 | 573 | 673 |
| Cu | 1.67 | 2.89 | 3.57 | 4.39 |
| Na | 4.2 | 13.50 | 17.50 | 21.90 |

As can be seen from this Table, the specific resistivity of liquid sodium at 673° K. exceeds that of pure copper by only a factor of 5. Accordingly, in order to obtain unchanged conductor resistance, the hollow section must have about double the diameter of the solid end of the copper terminal.

For further details, reference is made to the discussion which follows in light of the accompanying drawing, wherein the single FIGURE is a diagrammatic illustration of an embodiment of the invention.

Referring to that FIGURE, a battery housing wall 1 is traversed by the battery terminal 2 in such a manner that its portion 3, which takes the form of a hollow conductor, is mainly embedded within the heat insulation 4 of the battery housing. Within the battery interior 5, the battery terminal contacts the cell connections. The diameter of a battery terminal embodying the invention may, for example, be 10 mm in its solid sections, and 20 mm in its hollow section. It may be about 100 mm long.

To fill the hollow conductor 3, the low melting point metal 6 is provided in storage container 7. This metal is ducted through a pipe 8 into the hollow space 9.

As shown in the drawing, the displacement of the liquid metal 6 can be carried out by means of gas pressure. To this end, an inert gas is forced by means of an external pump (not shown) through the three-way valve 10 via the gas pipe 11 into the storage container 7, after the hollow interior 9 has previously been evacuated through gas pipe 12. During operation, the liquid metal 6 is prevented from flowing back by maintaining the gas pressure within storage container 7. At the start of a rest period, the gas pressure in the storage container 7 is relieved by three-way valve 10, so that the liquid metal flows out of hollow interior 9 under its own weight. For the duration of the rest period, it leaves behind a vacuum heat barrier. Alternatively, it can be replaced by an inert gas filling, by means of three way valve 10.

If a temperature difference of 480° K. exists between the interior of the battery and the ambient, then two terminals such as shown in the drawing, and made of copper and a sodium filling, produce a heat out-flow of 50 watts. This contrasts with 160 watts for solid terminals of 10 mm diameter and 200 mm length. This yields a reduction of about 70% in heat outflow Meltable materials which can be used, in addition to those mentioned previously, include lithium, cadmium and bismuth.

I claim:

1. A battery terminal for high temperature batteries having a housing with heat insulation, said terminal comprising: a portion which takes the form of a hollow conductor in the region of its passage through the heat insulation of the battery housing, and said hollow interior being filld with a low melting point metal during operation of the battery and being emptied of said metal during battery rest.

2. The terminal of claim 1, wherein the hollow conductor is connected by a conduit with a storage container positioned within the interior of the battery housing for the metal which is emptied from said hollow interior during battery rest.

3. The terminal of claim 1, wherein the melting point of the low melting point metal is lower than the temperature surrounding the hollow conductor, so that said metal fills the hollow interior of the conductor in the liquid state.

4. In a high temperature battery which has at least one metal battery terminal protruding through the battery housing, a system for reducing the heat loss through said metal terminal during battery rest periods while simultaneously reducing the electrical coupling through said terminal, said system comprising:

a hollow portion in said conductor, means for filling said hollow portion with a liquid metal during battery operation, and means for emptying said hollow portion of said liquid metal during battery rest.

5. The system of claim 4 wherein the filling and emptying means include an inert gas which propels the liquid into or out of the hollow portion.

6. The system of claim 5 wherein the inert gas replaces the liquid metal in the emptied hollow portion.

7. The system of claim 5 wherein a vacuum is formed in the emptied hollow portion.

* * * * *